(No Model.)

G. H. STAHL.
INCUBATOR.

No. 368,249. Patented Aug. 16, 1887.

ON LINE X-X

ON LINE Y-Y

Attest:
Sidney P. Hollingworth
N. R. Kennedy

Inventor:
G. H. Stahl
By his Atty,
Phil. T. Dodge

UNITED STATES PATENT OFFICE.

GEORGE H. STAHL, OF QUINCY, ILLINOIS.

INCUBATOR.

SPECIFICATION forming part of Letters Patent No. 368,249, dated August 16, 1887.

Application filed April 26, 1887. Serial No. 236,195. (No model.)

*To all whom it may concern:*

Be it known that I, GEORGE H. STAHL, of Quincy, in the county of Adams and State of Illinois, have invented certain Improvements in Incubators, of which the following is a specification.

This invention consists in an incubator provided with a heating apparatus of peculiar construction, hereinafter described, a perforated and corrugated egg-tray, a valved diaphragm between the hot-air chamber and the egg-tray, and a thermostatic valve-controlling mechanism of peculiar construction.

The invention also consists in certain details of construction hereinafter set forth.

Figure 1:
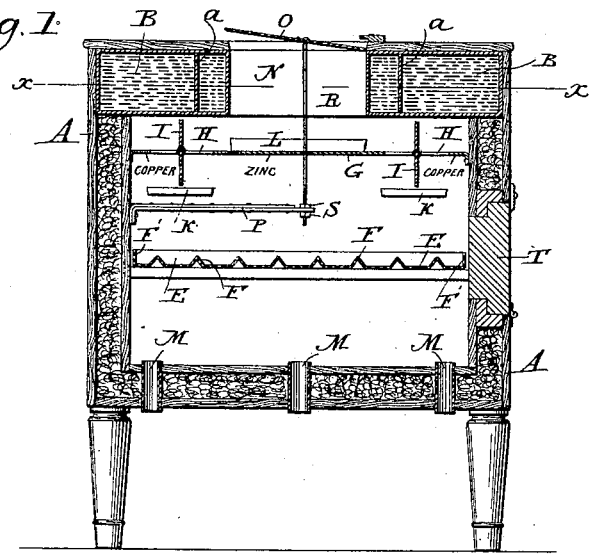
Figure 2:
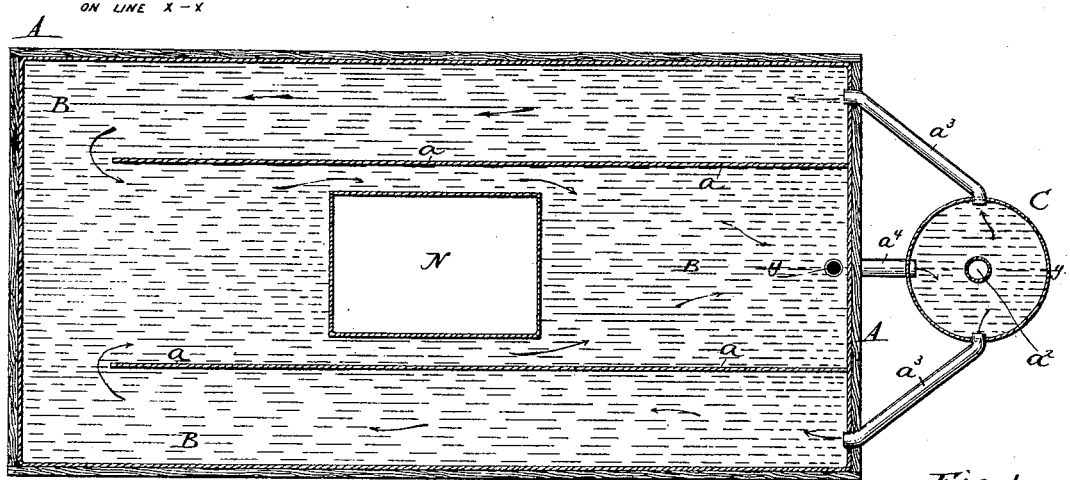
Figure 3:
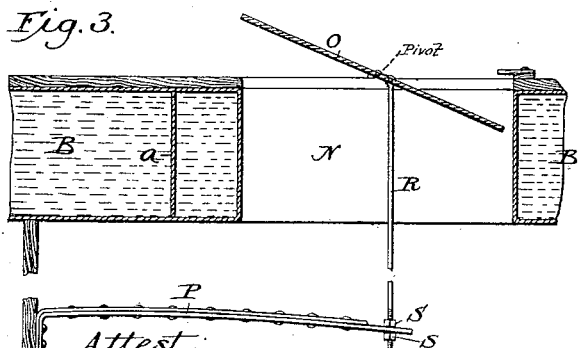
Figure 4:
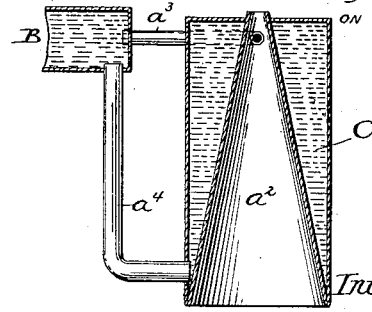

In the accompanying drawings, Figure 1 is a vertical cross-section of the incubator. Fig. 2 is a horizontal section above the heater, indicated by the line $x\ x$, Fig. 1. Fig. 3 is an enlarged detail view of the thermostat and valve. Fig. 4 is a vertical section on the line $y\ y$ through the forward end of the tank and heating-vessel.

The body A of the incubator is preferably constructed of double thickness, with the space between the partitions forming the walls filled with any suitable substance non-conductive of heat; but, instead of double walls provided with a filling, any means whereby the body is made non-conductive of heat may be employed.

Within the body and filling its entire top I mount a shallow metal tank or vessel, B, with two vertical partitions, $a$, extending inward from one end nearly to the other, near the opposite sides. Outside of the body I mount a water-vessel, C, with a conical flue or opening, $a^2$, therethrough for the passage of the heated air and products from a lamp or other heater. Pipes $a^3$ lead from the top of this vessel into the two sides of the tank B, and a third pipe, $a^4$, returns the water from the middle of the tank to the base of the heating-vessel. By this arrangement the heated water is caused to flow longitudinally through the outer sides of the tank and return through its middle to the heater, being thus delivered when at its highest temperature near the outer walls of the body, so that the heat is distributed and the temperature equalized within the apparatus in a satisfactory manner.

Arranged about midway of the height of the body is an egg-tray, E, formed preferably of perforated sheet-zinc, and provided with a series of parallel corrugations, F, at such distances apart as to receive eggs between them, the purpose of the said corrugations being to prevent the eggs from coming in contact one with another.

The egg-tray may have a flange, F', extending around it for preventing the eggs from coming in contact with the walls of the incubator. Between the egg-tray and the heating-tank is a diaphragm, G, formed preferably of a zinc central portion and copper edge portions, separated by apertures H, extending in the direction of the length of the pipes and the corrugations in the tray. The apertures H are provided with valves or dampers I, to be adjusted by hand for regulating the flow of air through them, and below them are arranged evaporating-pans K. An evaporating-pan, L, is placed on the central portion of the diaphragm under the heating-tank.

Through the bottom of the body are a number of openings, M, preferably at the center and sides thereof, and midway of the top is an opening, N, provided with a valve or damper, O. This damper may be controlled in any suitable way to control the flow of heated air from the incubator and thereby regulate the temperature of the air in the body; but I prefer to control it by a thermostat, P, such as is illustrated in the drawings, and which consists of two or more strips of material—as vulcanite and a metal—secured together, and which have different indices of expansion, and, being secured together as stated, will bend when subjected to sufficient heat. Such strips, when fastened at one end to a stationary support and at the other end to a rod, R, which is secured to the damper at one side of the pivot-point thereof, will form a delicate but simple and cheap thermostat.

To regulate the thermostat I provide the rod R with a threaded portion extending through the free end of one of the strips projecting beyond the others for the purpose, and on which on each side of the said extended strip are nuts S, by means of which any degree of tension may be applied to the thermostat, which tension must be overcome before the valve or damper will be opened.

The incubator is provided with a door, T, through which access to the interior thereof may be had, and it may also be provided with legs.

The heated air will absorb moisture from the pan L, and also from the pans K, below the openings in the diaphragm, and hence the air surrounding the eggs will have the requisite degree of moisture.

As the heat near the sides of the interior of the incubator is absorbed more quickly than that in the central portions, a greater amount of heat must be supplied at the said sides, and this I accomplish by leading the heated water first to the sides of the incubator, and by forming the passages through the diaphragm near the said sides, and by making the outer portions of the diaphragm of copper, which is a much better conductor of heat than zinc. Thus the radiation of heat from the diaphragm is equalized throughout. Any undue increase of heat in the incubator will cause the thermostat to open the valve O and permit an upward movement of the air, thus allowing air to enter the body through the openings in the bottom thereof. The movement of the air will be so slow that the cool air will be evenly distributed, and will reduce the temperature within the body only sufficiently to prevent overheating the eggs.

The valves in the openings through the diaphragm serve to regulate the passage of the air from one side thereof to the other.

I am aware that heating-pipes have been variously arranged to maintain a uniform temperature in an incubator; but a flat tank with partitions, such as herein shown and described, has been found to give the result desired in a more satisfactory manner and at a less cost.

Having thus described my invention, and without limiting myself to the precise construction and arrangement of parts shown, I claim—

1. In an incubator, a heating system, an egg-tray below the same, and an intermediate diaphragm provided with valved openings, substantially as described.

2. In an incubator, a heating system, an egg-tray below the same, an intermediate diaphragm with valved openings, and evaporating-pans above the diaphragm and below the openings therein, substantially as described.

3. In an incubator, as a means of uniformly heating its interior chamber, the flat tank overlying said chamber and provided with the two partitions extending from one end nearly to the other on opposite sides of its middle, in combination with the external heating-vessel, the two pipes $a^3$, leading from its top into opposite sides of the tank outside of the partitions, and the return-pipe $a^4$, located at the same end of the tank and extending from a point between the partitions to the base of the heater, whereby the hot water is delivered in two currents along the sides of the tank and returned through its middle to the heater.

4. In an incubator, the egg-tray consisting of sheet metal corrugated to form ribs for the separation of the eggs and perforated between the corrugations to permit the free circulation of air around the eggs.

5. The improved incubator consisting of a suitable body with openings in the bottom and a valved opening at the top, a heating system at the upper part of the body, a valved diaphragm below the said heating system, evaporating-pans above and below the diaphragm, and a perforated and corrugated egg-tray below the diaphragm, substantially as described.

In testimony whereof I hereunto set my hand, this 24th day of February, 1887, in the presence of two attesting witnesses.

GEO. H. STAHL.

Witnesses;
ALBERT BERGER,
SIMON BERGER.